(12) United States Patent
Jeon

(10) Patent No.: US 10,648,580 B2
(45) Date of Patent: May 12, 2020

(54) CHECK VALVE

(71) Applicant: MANDO CORPORATION, Pyeongtaek-si, Gyeonggi-do (KR)

(72) Inventor: In-Wook Jeon, Seoul (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 226 days.

(21) Appl. No.: 15/367,956

(22) Filed: Dec. 2, 2016

(65) Prior Publication Data

US 2017/0159834 A1  Jun. 8, 2017

(30) Foreign Application Priority Data

Dec. 4, 2015 (KR) .......................... 10-2015-0172061

(51) Int. Cl.
*F16K 15/02* (2006.01)
*F16K 1/46* (2006.01)
(Continued)

(52) U.S. Cl.
CPC ............ *F16K 15/026* (2013.01); *B60T 8/341* (2013.01); *F16K 1/46* (2013.01); *F16K 15/063* (2013.01);
(Continued)

(58) Field of Classification Search
CPC ........ F16K 1/46; F16K 15/026; F16K 15/063; F16K 27/0209; Y10T 137/7929; B60T 15/00; B60T 8/341
See application file for complete search history.

(56) References Cited

U.S. PATENT DOCUMENTS 2,233,649 A * 3/1941 Stahl ..................... F16K 15/063
137/533.25
4,859,155 A * 8/1989 Laqua ..................... F04B 49/24
417/307

(Continued)

FOREIGN PATENT DOCUMENTS

CN      2366628 Y    3/2000
CN      1500191 A    5/2004
(Continued)

OTHER PUBLICATIONS

Chinese Office Action dated Jul. 29, 2019 issued in Chinese Patent Application No. 201611105163.1 (with English translation).
(Continued)

*Primary Examiner* — Marina A Tietjen
*Assistant Examiner* — Frederick D Soski
(74) *Attorney, Agent, or Firm* — Morgan, Lewis & Bockius LLP

(57) ABSTRACT

Disclosed herein is a check valve. The check valve installed in a bore of a modulator block having an inlet path and an outlet path and configured to control oil to flow in one direction, the check valve comprising: a valve housing installed in the bore, including an inlet and an outlet configured to respectively communicate with the inlet path and the outlet path, and having an open upper portion; a cap member configured to seal the open upper portion of the valve housing and fixed to the modulator block; a plunger provided to move forward or backward in the valve housing and configured to open or close an internal path between the inlet and the outlet; and a spring provided between the cap member and the plunger and configured to press the plunger to close the internal path.

9 Claims, 4 Drawing Sheets

(51) Int. Cl.
*F16K 27/02* (2006.01)
*B60T 15/00* (2006.01)
*B60T 8/34* (2006.01)
*F16K 15/06* (2006.01)

(52) U.S. Cl.
CPC .......... *F16K 27/0209* (2013.01); *B60T 15/00* (2013.01); *Y10T 137/7929* (2015.04)

(56) References Cited

U.S. PATENT DOCUMENTS

| | | | | |
|---|---|---|---|---|
| 4,860,995 | A * | 8/1989 | Rogers | F04B 53/1027 251/356 |
| 6,682,315 | B2 * | 1/2004 | Gens | F04B 1/143 417/269 |
| 6,783,337 | B2 * | 8/2004 | Nelson | F04B 1/141 137/454.4 |
| 7,335,002 | B2 * | 2/2008 | Vicars | F04B 53/007 137/512 |
| 7,905,252 | B2 * | 3/2011 | Neumann | F17C 5/06 137/606 |
| 2004/0130206 | A1 * | 7/2004 | Yang | B60T 8/4031 303/116.4 |
| 2005/0088039 | A1 * | 4/2005 | Yang | B60T 8/4031 303/11 |

FOREIGN PATENT DOCUMENTS

| | | | |
|---|---|---|---|
| CN | 1923587 A | 3/2007 | |
| EP | 1759947 A2 * | 3/2007 | ............. B60T 7/122 |
| KR | 10-2013-0092045 A | 8/2013 | |
| WO | 02/079696 A1 | 10/2002 | |

OTHER PUBLICATIONS

Chinese Office Action dated Dec. 11, 2018 issued in Chinese Patent Application No. 201611105163.1.

* cited by examiner

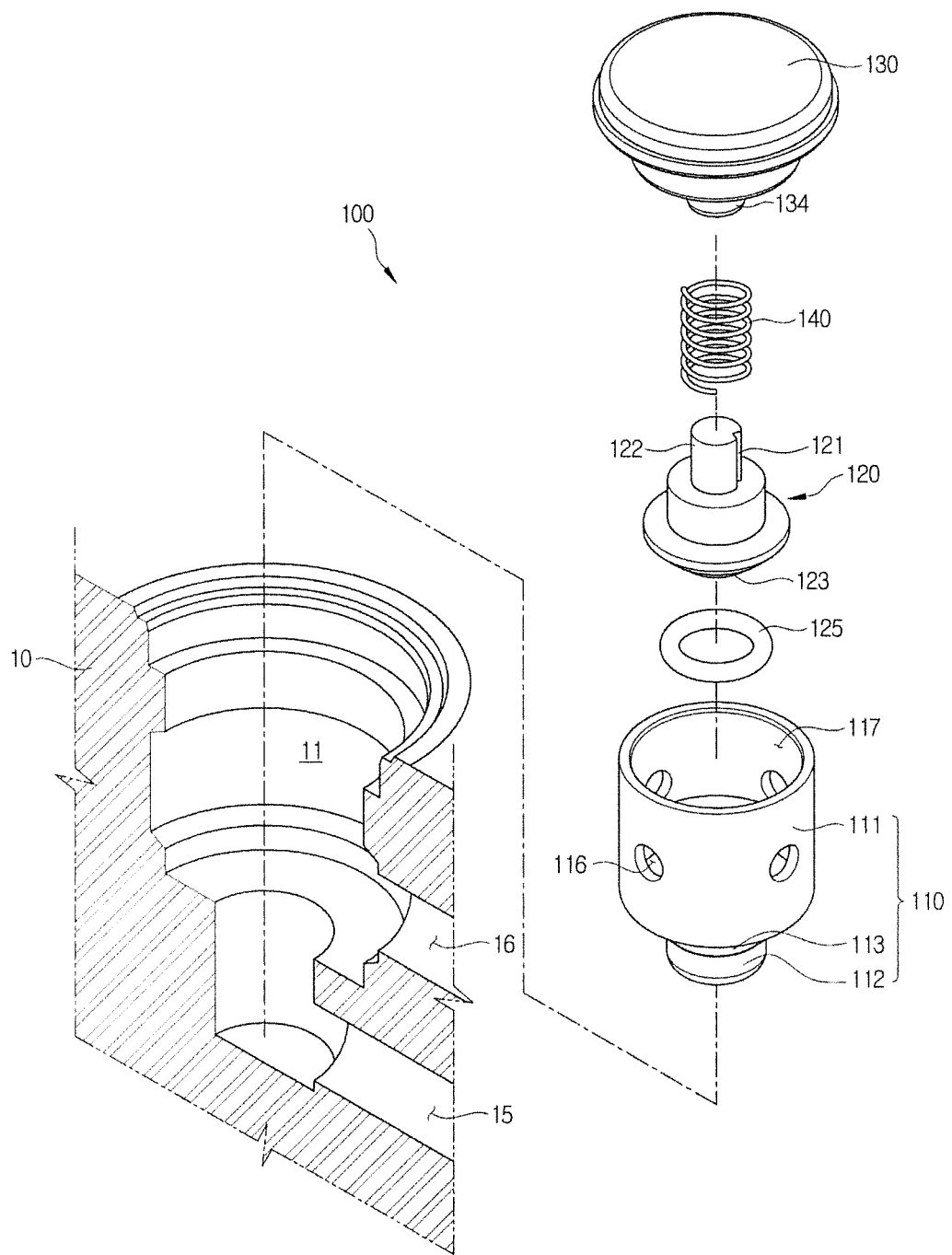
[Fig. 1]

[Fig. 2]
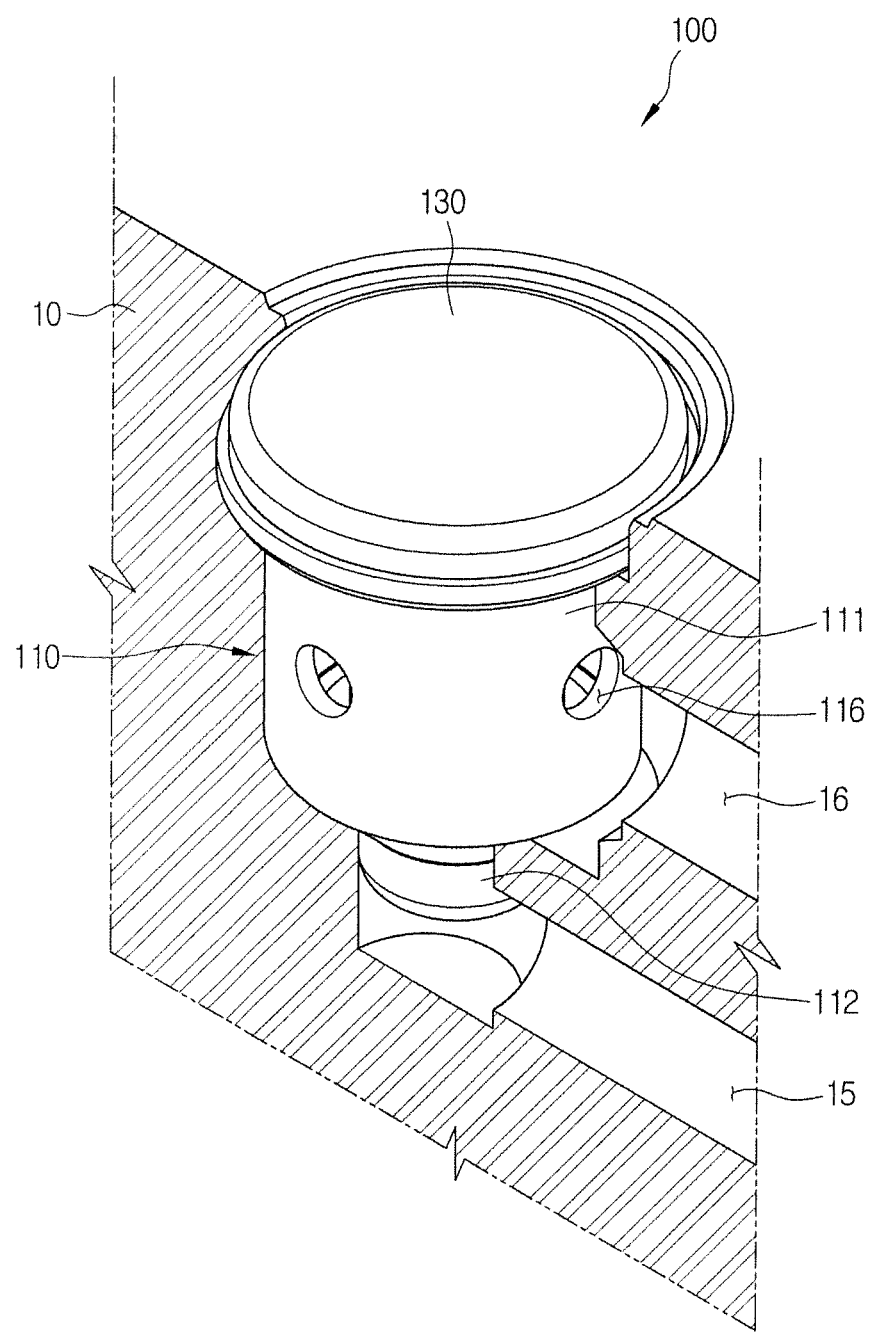

[Fig. 3]
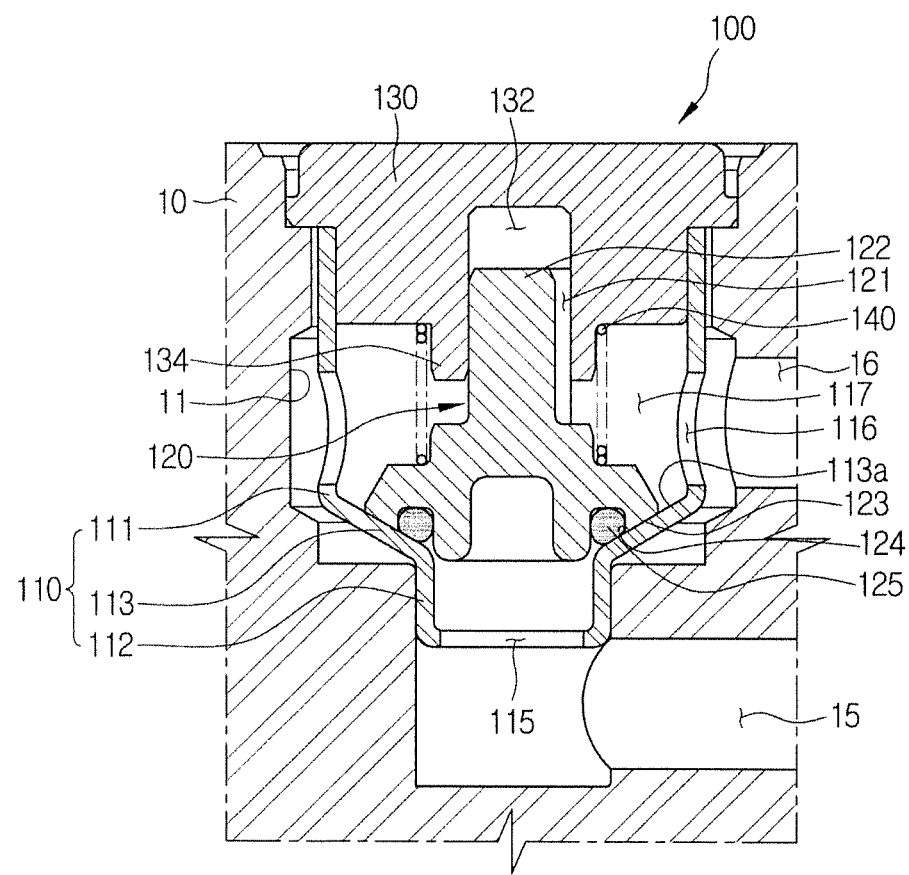

[Fig. 4]
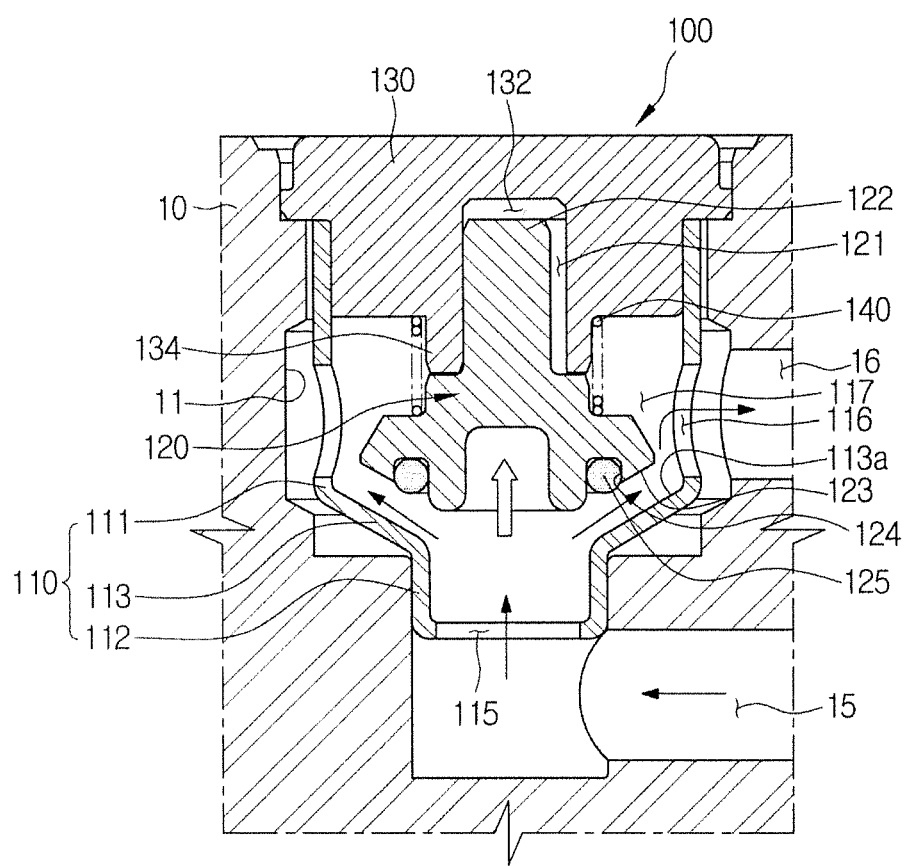

CHECK VALVE

CROSS-REFERENCE TO RELATED APPLICATION

This application claims priority to and the benefit of Korean Patent Application No. 2015-0172061, filed on Dec. 4, 2015, the disclosure of which is incorporated herein by reference in its entirety.

BACKGROUND

1. Field of the Invention

Embodiments of the present disclosure relate to a check valve, and more particularly, to a check valve provided at a hydraulic path of an electronically controlled brake system to control a flow of oil to be in only one direction.

2. Discussion of Related Art

In general, an electronically controlled brake system is for efficiently preventing a slip phenomenon of a wheel which can occur when a vehicle is braked, suddenly and unintentionally accelerated, or rapidly accelerated, and includes a plurality of solenoid valves configured to control brake oil pressure transferred from a master cylinder to a wheel cylinder, an accumulator configured to temporarily store oil flowing out of the wheel cylinder, a pump configured to send oil flowing out of the wheel cylinder toward the master cylinder, and an electronic control unit (ECU) configured to control driving of the solenoid valve and the pump. The solenoid valve, the accumulator, and the pump are installed in a modulator block including a path forming a hydraulic circuit and control brake oil pressure.

The check valve is installed at a proper place at a path formed in the modulator block as described above for controlling a flow of oil to be in one direction.

As is well known, the check valve includes a valve seat which is provided in a valve housing and in which an oil path is formed, a ball configured to open or close the oil path, an elastic member configured to elastically support the ball, a retainer configured to prevent the elastic member from escaping, and the like so that oil flows in only one direction.

However, since a conventional check valve is formed to open or close an oil path using a ball, a contact surface of the oil path which comes into contact with the ball has to be precisely processed, and thus a structure thereof becomes complex and cost also increases.

In addition, since each part of a conventional check valve is manufactured through a molding process or forging process, there is a problem in that manufacturing is difficult and process costs increase. In addition, when a check valve is installed in the modulator block, since parts have to be sequentially installed, there is a problem in that precise installation and management are difficult.

PRIOR ART DOCUMENT

Patent Document (Patent Document) Korean Laid-open Patent Application No. 10-2005-0092892 (HYUNDAI MOBIS, Sep. 23, 2005)

SUMMARY OF THE INVENTION

Therefore, it is an aspect of the present disclosure to provide a check valve having a simplified structure and manufactured with a low cost process so that a manufacturing cost thereof is decreased, and provided to be manufactured as a single finished assembly to ensure ease of operation thereof.

Additional aspects of the disclosure will be set forth in part in the description which follows and, in part, will be obvious from the description, or may be learned by practice of the disclosure.

In accordance with one aspect of the present disclosure, a check valve installed in a bore of a modulator block having an inlet path and an outlet path and configured to control oil to flow in one direction, the check valve comprising: a valve housing installed in the bore, including an inlet and an outlet configured to respectively communicate with the inlet path and the outlet path, and having an open upper portion; a cap member configured to seal the open upper portion of the valve housing and fixed to the modulator block; a plunger provided to move forward or backward in the valve housing and configured to open or close an internal path between the inlet and the outlet; and a spring provided between the cap member and the plunger and configured to press the plunger to close the internal path.

Also, a step or inclined portion configured to support a lower portion of the plunger is formed in the valve housing; and the step or inclined portion is formed between the inlet and the outlet.

Also, the inclined portion includes an inclined surface having a tapered shape.

Also, a contact surface corresponding to the inclined surface is formed at the lower portion of the plunger to come into surface contact with the inclined surface.

Also, an accommodation groove is formed in the lower portion of the plunger; and a sealing member pressed against the inclined surface along with the contact surface is installed in the accommodation groove.

Also, an insertion groove is formed in a lower portion of the cap member; and a rod inserted into the insertion groove and configured to guide movement of the plunger is formed on the plunger.

Also, a slot through which the insertion groove communicates with the internal path of the valve housing is formed in an outside surface of the rod.

Also, the slot includes first to third slots disposed at intervals of 120° along a circumference of the rod.

Also, a supporting protrusion inserted into the spring and configured to support the spring is formed under the cap member.

Also, the valve housing is formed by a press method.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is an exploded perspective view illustrating a state in which a check valve according to one embodiment of the present disclosure is assembled in a modulator block.

FIG. 2 is a perspective view illustrating assembly corresponding to FIG. 1.

FIG. 3 is a cross-sectional view illustrating the check valve.

FIG. 4 is a cross-sectional view illustrating an operation state of the check valve.

DETAILED DESCRIPTION OF EXEMPLARY EMBODIMENTS

Hereinafter, embodiments of the present disclosure will be described in detail with reference to the accompanying drawings. The embodiments are provided in order to fully explain the spirit and scope of the present disclosure to those skilled in the art. Thus, the present disclosure is not to be construed as limited to the embodiments set forth herein and may be accomplished in other various embodiments. Parts irrelevant to the description are omitted in the drawings in order to clearly explain the present disclosure. Sizes of elements in the drawings may be exaggerated in order to facilitate understanding.

FIG. 1 is an exploded perspective view illustrating a state in which a check valve according to one embodiment of the present disclosure is assembled in a modulator block, FIG. 2 is a perspective view illustrating assembly corresponding to FIG. 1, and FIG. 3 is a cross-sectional view illustrating the check valve.

Referring to FIGS. 1 to 3, a check valve 100 includes a valve housing 110 including an inlet 115 and outlets 116, a cap member 130 coupled to an upper portion of the valve housing 110, a plunger 120 provided to move forward or backward in the valve housing 110, and a spring 140 configured to elastically press the plunger 120. The check valve 100 is assembled as a single finished assembly and installed in a bore 11 formed in the modulator block 10 to prevent oil backflow and to control oil to flow in one direction.

The valve housing 110 has a cylindrical shape with an open upper portion and includes the inlet 115 and the outlets 116 which are formed in the modulator block 10 and respectively communicate with an inlet path 15 and an outlet path 16. Here, the valve housing 110 is installed in the bore 11, and the inlet 115 and the outlets 116 are formed to correspond to positions at which the inlet path 15 and the outlet path 16 are formed. More specifically, the valve housing 110 is formed to be stepped to support a lower portion of the plunger 120 which will be described below. Accordingly, the valve housing 110 is divided into a first body 111 having a large diameter portion and a second body 112 having a small diameter portion smaller than the first body 111. Here, an inclined portion 113, which connects the first body 111 with the second body 112, has an inclined surface 113a in a tapered shape. In addition, the inclined portion 113 is formed between the inlet 115 and the outlets 116.

As described above, as the valve housing 110 is divided into the first and second bodies 111 and 112 by the inclined portion 113, the inlet 115 is formed in a lower portion of the second body 112, and the outlets 116 are formed in a perimeter of the first body 111. In addition, an inside of the valve housing 110 serves as an internal path 117 so that oil introduced through the inlet 115 is discharged through the outlet 116. The valve housing 110 may be manufactured by a press method.

Meanwhile, the inlet 115 and the outlets 116 are formed so that oil smoothly flows, and positions thereof in the valve housing 110 may be changed according to positions at which the inlet path 15 and the outlet path 16 are formed.

The plunger 120 is provided to move forward or backward in the valve housing 110 and serves to open or close the internal path 117 between the inlet 115 and the outlet 116. The lower portion of the plunger 120 is formed to correspond to the inclined portion 113 to be in surface contact with the inclined surface 113a to open or close the internal path 117. That is, a contact surface 123 having a tapered shape to correspond to the inclined surface 113a is formed at the lower portion of the plunger 120. Accordingly, when the contact surface 123 of the plunger 120 is in contact with the inclined surface 113a, the internal path 117 is closed and oil backflow is prevented.

In addition, a sealing member 125 may be installed at the lower portion of the plunger 120 to improve a sealing performance for preventing oil from flowing back through the plunger 120. The sealing member 125 is installed in an accommodation groove 124 formed in the lower portion of the plunger 120 and is pressed against the inclined surface 113a, along with the contact surface 123. That is, as the sealing member 125 and the contact surface 123 are pressed against the inclined portion 113 at the same time, a hydraulic pressure is secondarily blocked, and thus the sealing performance is improved.

The sealing member 125 may perform a backup sealing function. For example, even when a gap between the contact surface 123 and the inclined surface 113a is formed by high pressure oil introduced through the inlet 115, as the sealing member 125 comes into contact with the inclined surface 113a, the backup sealing may be performed.

The plunger 120 is elastically pressed toward the inclined portion 113 by the spring 140 which will be described below. Accordingly, in a state in which the plunger 120 is pressed by the spring 140 and is pressed against the inclined portion 113, the internal path 117 is closed and oil backflow is prevented. However, when the plunger 120 is spaced apart from the inclined portion 113 by a pressure of oil introduced through the inlet 115, the oil is discharged to the outlet path 16 through the internal path 117 and the outlet 116. Here, when a pressure of oil introduced through the inlet 115 is less than an elastic force of the spring 140, the plunger 120 is pressed toward the inclined portion 113, and thus the internal path 117 is closed.

Meanwhile, a rod 122 formed to extend upward is provided on an upper portion of the plunger 120. The rod 122 is inserted into an insertion groove 132 of the cap member 130, which will be described below, serves to guide the plunger 120 to stably move when the plunger 120 moves forward or backward, and will be described again below. The plunger 120 may be manufactured by an injection method.

The cap member 130 seals the open upper portion of the valve housing 110 and is fixed to the modulator block 10. More specifically, the insertion groove 132, into which the rod 122 is inserted, is formed under the cap member 130. When the plunger 120 moves, the insertion groove 132 guides the plunger 120 to stably move forward or backward as described above. In addition, the insertion groove 132 prevents the plunger 120 from tilting when the plunger 120 moves forward or backward.

In addition, a supporting protrusion 134 inserted into the spring 140 to support the spring 140 is formed under the cap member 130. The supporting protrusion 134 is formed around the insertion groove 132. Accordingly, the spring 140 is disposed between the cap member 130 and the plunger 120, an upper end thereof is supported by the supporting protrusion 134, and a lower end thereof is in contact with the plunger 120 to press the plunger 120.

Meanwhile, since the valve housing 110 is provided in a state in which an inside thereof is filled with oil and the rod 122 is inserted into the insertion groove 132, movement of the plunger 120 may not be smooth. Accordingly, a slot 121 is formed in an outer circumferential surface of the rod 122 in a longitudinal direction for smooth operation and performance improvement of the plunger 120 and decreasing noise while operating. The slot 121 performs the above-described function by enabling the insertion groove 132 of the cap member 130 to communicate with the internal path 117 of the valve housing 110 and enabling the insertion groove 132 to be filled with oil.

In addition, a plurality of slots identical to the slot 121 may be provided. For example, three slots 121 may be disposed at intervals of 120° in a circumferential direction of the rod 122.

According to one embodiment of the present disclosure, the above-described check valve 100 is provided as an integrated assembly. That is, when the plunger 120 is positioned on the inclined portion 113 in the valve housing 110 and is coupled to the cap member 130 with the spring 140, one finished product is manufactured. Accordingly, since the finished product which is assembled may be installed at the outside of the modulator block 10, ease of manufacturing and assembly is achieved and mass-productivity is improved in comparison to a process in which each part is individually installed to install a conventional check valve.

Then, an operation of the check valve having the above-described structure will be simply described with reference to FIGS. 3 and 4.

First, as illustrated in FIG. 4, oil is introduced into the inlet 115 of the valve housing 110 through the inlet path 15. Here, when a pressure of the introduced oil is greater than an elastic force of the spring 140, the plunger 120 moves upward to be spaced apart from the inclined portion 113 and opens the internal path 117 of the valve housing 110. That is, as the inlet 115 communicates with the outlet 116, the oil is discharged to the outlet path 16.

Next, when a pressure of the oil is less than an elastic force of the spring 140 as described in FIG. 3, the plunger 120 is pressed by the spring 140 and comes into contact with the inclined portion 113. Here, as the contact surface 123 formed on the lower portion of the plunger 120 is in surface contact with the inclined surface 113a of the inclined portion 113, and the sealing member 125 is pressed against the inclined surface 113a, a secondary sealing function is performed. Accordingly, even when leakage occurs between the plunger 120 and the inclined portion 113 due to high pressure, the leakage is prevented by the sealing member 125, and thus sealing performance is improved in comparison to a conventional check valve.

As is apparent from the above description, in a check valve according to one embodiment of the present disclosure, there are effects in that mass-productivity is excellent because the check valve is manufactured as a single finished assembly product and ease of assembly process can also be achieved because an integrated check valve is assembled at the outside.

In addition, in a structure in which a plunger configured to prevent oil backflow comes into contact with a valve housing, since the plunger comes into surface contact with the valve housing and a hydraulic pressure is secondarily prevented by a sealing member, sealing performance is improved.

In addition, since a flow of oil is controlled while a movement of a plunger is guided, reactivity for implementing movement of a check valve can be excellent and manufacturing can be easy in comparison to a check valve using a conventional ball.

Meanwhile, since a plunger and a valve housing are manufactured by an injection method and a press method which are low cost processes, a manufacturing cost can be decreased in comparison to high cost processes such as a conventional molding and forging process.

As described above, although the present disclosure has been shown and described with respect to a few specific embodiments and drawings, those skilled in the art should appreciate that various modifications and changes may be made in the technical concept of the present disclosure, the scope of which is defined in the claims and their equivalents.

[Reference Numerals]

| | |
|---|---|
| 100: CHECK VALVE | 110: VALVE HOUSING |
| 113: INCLINED PORTION | 120: PLUNGER |
| 122: ROD | 123: CONTACT SURFACE |
| 125: SEALING MEMBER | 130: CAP MEMBER |
| 132: INSERTION GROOVE | 140: SPRING |

What is claimed is:

1. A check valve installed in a bore of a modulator block having an inlet path and an outlet path and configured to control oil to flow in one direction, the check valve comprising:
   a valve housing disposed in the bore and including an inlet and an outlet configured to respectively communicate with the inlet path and the outlet path, wherein the valve housing has an internal path, which communicates with the outlet and the outlet path, inside the valve housing and an open upper portion opened at an upper side of the valve housing;
   a cap member configured to seal the open upper portion of the valve housing, wherein the cap member is fixed to the modulator block;
   a plunger configured to move upward or downward in the valve housing and configured to open or close the internal path between the inlet and the outlet; and
   a spring disposed between the cap member and the plunger inside the internal path and configured to press the plunger to close the internal path, such that a fluid, which is introduced into the inlet through the inlet path, flows out to the outlet through the internal path and the outlet path sequentially,
   wherein the valve housing includes a first body, an inclined portion, and a second body,
   wherein the inclined portion is connected between the first body and the second body, and tapered downward between the inlet and the outlet,
   wherein the second body has an outer diameter smaller than that of the first body and has a cup shape extending downwards from the inclined portion, and
   wherein the plunger includes an end groove grooved at a center end thereof so as to face the inlet.

2. The check valve of claim 1,
   wherein the inclined portion is configured to support a lower portion of the plunger.

3. The check valve of claim 2, wherein an inclined surface of the inclined portion has a tapered shape.

4. The check valve of claim 3, wherein the plunger has a contact surface corresponding to the inclined surface at the lower portion of the plunger to come into surface contact with the inclined surface.

5. The check valve of claim 4, wherein the plunger comprises:
   an accommodation groove circumferentially grooved in a ring shape at the lower portion of the plunger; and
   a sealing member having a ring shape to correspond to the accommodation groove, wherein the sealing member is disposed in the accommodation groove and pressed against the inclined surface.

6. The check valve of claim 1, wherein the cap member includes:
an insertion groove at a lower portion of the cap member, wherein the plunger comprises a rod which is inserted into the insertion groove and configured to guide movement of the plunger.

7. The check valve of claim 6, wherein the rod has a slot, through which the insertion groove communicates with the internal path of the valve housing, at an outside surface of the rod.

8. The check valve of claim 7, wherein the slot includes first to third slots disposed at intervals of 120° along a circumference of the rod.

9. The check valve of claim 1, wherein the cap member includes a supporting protrusion inserted into the spring and configured to support the spring under the cap member.

* * * * *